US009166392B2

(12) United States Patent
 Nooner

(10) Patent No.: US 9,166,392 B2
(45) Date of Patent: Oct. 20, 2015

(54) ELECTRICAL CORD CONNECTION COVERING TECHNIQUES

(71) Applicant: Midwest Innovative Products, LLC, Frankfort, IL (US)

(72) Inventor: Bryan Nooner, Orland Park, IL (US)

(73) Assignee: Midwest Innovative Products, LLC, Orland Park, IL (US)

( * ) Notice: Subject to any disclaimer, the term of this patent is extended or adjusted under 35 U.S.C. 154(b) by 0 days.

(21) Appl. No.: 14/170,800

(22) Filed: Feb. 3, 2014

(65) Prior Publication Data

US 2014/0231423 A1  Aug. 21, 2014

Related U.S. Application Data

(60) Provisional application No. 61/767,436, filed on Feb. 21, 2013.

(51) Int. Cl.

| *H02G 15/115* | (2006.01) |
| *H01R 13/52* | (2006.01) |
| *H02G 3/08* | (2006.01) |
| *H01R 24/70* | (2011.01) |
| *H01R 13/639* | (2006.01) |
| *B65D 43/02* | (2006.01) |
| *B65D 41/06* | (2006.01) |

(52) U.S. Cl.
 CPC .......... *H02G 15/115* (2013.01); *H01R 13/5213* (2013.01); *H02G 3/088* (2013.01); *B65D 41/06* (2013.01); *B65D 43/0225* (2013.01); *H01R 13/639* (2013.01); *H01R 13/6392* (2013.01); *H01R 24/70* (2013.01)

(58) Field of Classification Search
 CPC ...................... B65D 2251/1033; B65D 43/162

USPC .................................................. 439/521, 892
 See application file for complete search history.

(56) References Cited

U.S. PATENT DOCUMENTS

| 2,080,685 A | * | 5/1937 | Ashe | 220/265 |
| 2,157,957 A | * | 5/1939 | Helse et al. | 174/480 |
| 3,938,726 A | * | 2/1976 | Holden et al. | 229/406 |
| 4,031,312 A | | 6/1977 | Coleman | |
| 4,585,138 A | * | 4/1986 | Jonkers | 220/615 |

(Continued)

OTHER PUBLICATIONS

PCT, Notification of Transmittal of the International Search Report and the Written Opinion of the International Searching Authority, or the Declaration, in International application No. PCT/US2014/014425, dated May 22, 2014 (11 pages).

*Primary Examiner* — Anthony Stashick
*Assistant Examiner* — Mollie Llewellyn
(74) *Attorney, Agent, or Firm* — McAndrews, Held & Malloy, Ltd.

(57) ABSTRACT

According to techniques of the present application, an apparatus for covering at least a portion of a cord includes a lower portion and an upper portion. The lower portion may include a bowl region having an upper rim. The lower portion may also include flexible tabs that substantially surround or completely surround the upper rim. Each of the flexible tabs may extend outwardly or downwardly from the upper rim. The upper portion may have a lower rim that extends below the outer edges of each of the flexible tabs when the upper portion is engaged to the lower portion. The upper portion may contact each of the flexible tabs when the upper portion is engaged to the lower portion. The apparatus may include a securing member extending downwardly from the lower portion to secure the apparatus to a resting surface.

16 Claims, 4 Drawing Sheets

(56) References Cited

U.S. PATENT DOCUMENTS

| | | | |
|---|---|---|---|
| 4,605,816 A * | 8/1986 | Jorgensen et al. | 174/661 |
| 4,643,505 A | 2/1987 | House | |
| 5,848,701 A * | 12/1998 | Riccabona | 206/702 |
| 5,860,530 A * | 1/1999 | Simmons et al. | 206/557 |
| 5,979,691 A * | 11/1999 | Von Holdt | 220/266 |
| 6,099,340 A | 8/2000 | Florentine | |
| 6,119,420 A * | 9/2000 | Koenig et al. | 52/255 |
| 6,464,077 B1 * | 10/2002 | Liu | 206/388 |
| 6,536,462 B1 * | 3/2003 | Laugen | 137/296 |
| 7,094,972 B2 | 8/2006 | Rodrigues | |
| 7,211,725 B1 | 5/2007 | Tait | |
| 8,087,531 B1 * | 1/2012 | Riemer | 220/254.5 |
| 2008/0105630 A1 * | 5/2008 | Lown | 211/1 |
| 2011/0031154 A1 * | 2/2011 | Overgaag et al. | 206/509 |

\* cited by examiner

ELECTRICAL CORD CONNECTION COVERING TECHNIQUES

CROSS REFERENCE TO RELATED APPLICATIONS

This application claims the benefit of U.S. Patent Application No. 61/767,436, filed on Feb. 21, 2013.

FEDERALLY SPONSORED RESEARCH OR DEVELOPMENT

[Not Applicable]

JOINT RESEARCH AGREEMENT

[Not Applicable]

SEQUENCE LISTING

[Not Applicable]

BACKGROUND

Generally, this application relates to techniques for protecting electrical connections, such as plug and socket connections between electrical cords.

It is generally desirable to prevent water or moisture from penetrating into an electrical connection. The presence of potentially problematic water or moisture may be found, for example, in outdoor environments. Some devices are known to protect such connections. Such devices, however, may only protect a connection between one plug and one socket.

Often, connections between cords may not be one-to-one. For example, plug strips or fans allow one cord to connect to multiple other cords and, thus, create multiple electrical connections. Such configurations may include a variable number of cords and plug arrangements.

It may be desirable to provide a device to protect a variable number of electrical connections from a variable number of electrical cords.

SUMMARY

According to techniques of the present application, an apparatus for covering at least a portion of a cord includes a lower portion and an upper portion. The lower portion may include a bowl region having an upper rim. The lower portion may also include flexible tabs that substantially surround or completely surround the upper rim. Each of the flexible tabs may extend outwardly or downwardly from the upper rim. When viewed from the top of the lower portion, each of the flexible tabs may have a convex curvature. Each of the flexible tabs may have a width between approximately ¼" and ½" (for example, ⅜"). Each of the flexible tabs may have a thickness of 0.031". Each of the flexible tabs may have a hardness of approximately between 60 Shore A to 75 Shore D (for example, 45 Shore D). The flexible tabs may be separated from one another by a distance of approximately 0.031"-0.25" (for example, 0.063").

The upper portion may have a lower rim that extends below the outer edges of the flexible tabs when the upper portion is engaged to the lower portion. The upper portion may contact each of the flexible tabs when the upper portion is engaged to the lower portion.

The lower portion may have an upwardly facing projection, and the upper portion may removably engage to this projection. The upper portion may engage via a downwardly facing projection. Engagement may be made by rotating the upper portion with respect to the lower portion.

The apparatus may include one or more securing members extending downwardly from the lower portion. The securing members may be removably engageable to the lower portion. The securing members may secure the apparatus to a resting surface upon which the apparatus rests.

Figure 1A:
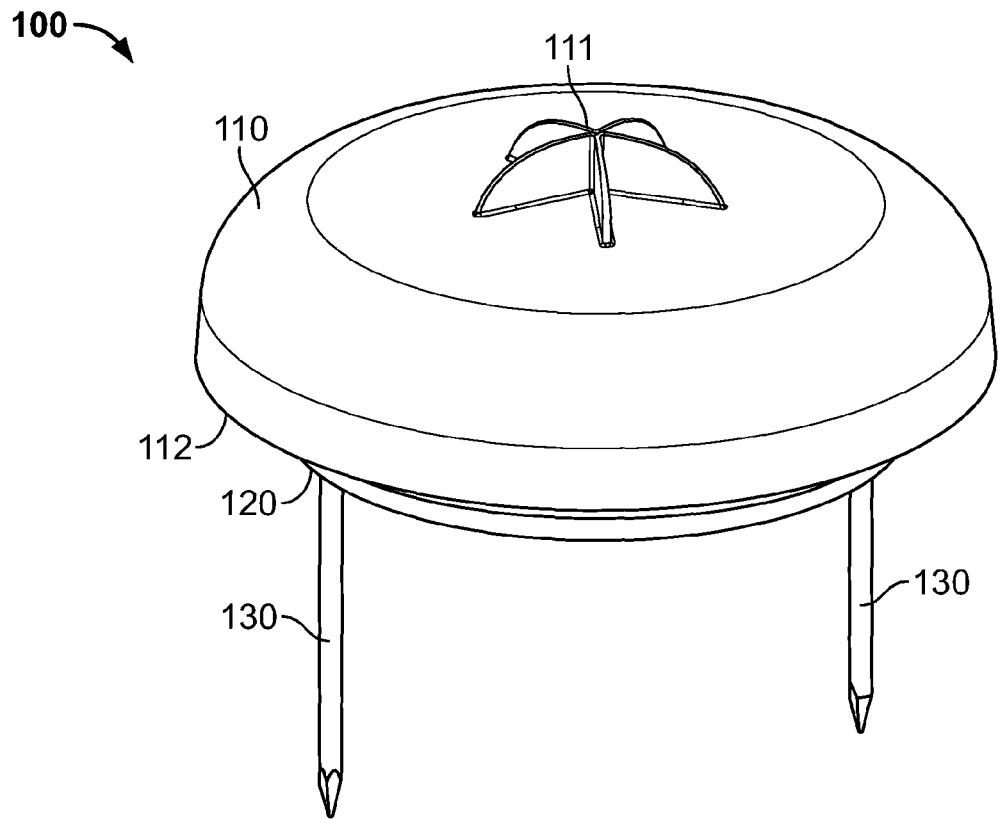
FIG. 1A illustrates a top perspective view of an electrical cord connection covering apparatus, according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Inventive techniques disclosed herein provide for an apparatus that protects electrical connections between electrical cords or wires from exposure to elements such as moisture. Such an apparatus can cover a plug and socket making an electrical connection while allowing for cords to pass into and out from the interior of the apparatus. The apparatus can accommodate a variety of different plug/socket sizes and arrangements. For example, a plug strip with multiple sockets mated with multiple plugs can be enclosed within the apparatus. When multiple sockets are enclosed, some may not be mated with plugs, thereby increasing exposure of said sockets to elements. The inventive apparatus disclosed herein provides a solution to covering such non-engaged sockets.

The design of the inventive apparatus disclosed herein can be opened and closed with relative ease. Once open, the configuration/number of plugs, cords, and sockets can be adjusted. The apparatus can then be closed and the protective nature of the apparatus will be substantially maintained. Portions of the apparatus can also be inserted into a resting surface (for example, the ground) to substantially secure the apparatus to the resting surface.

Figure 1B:
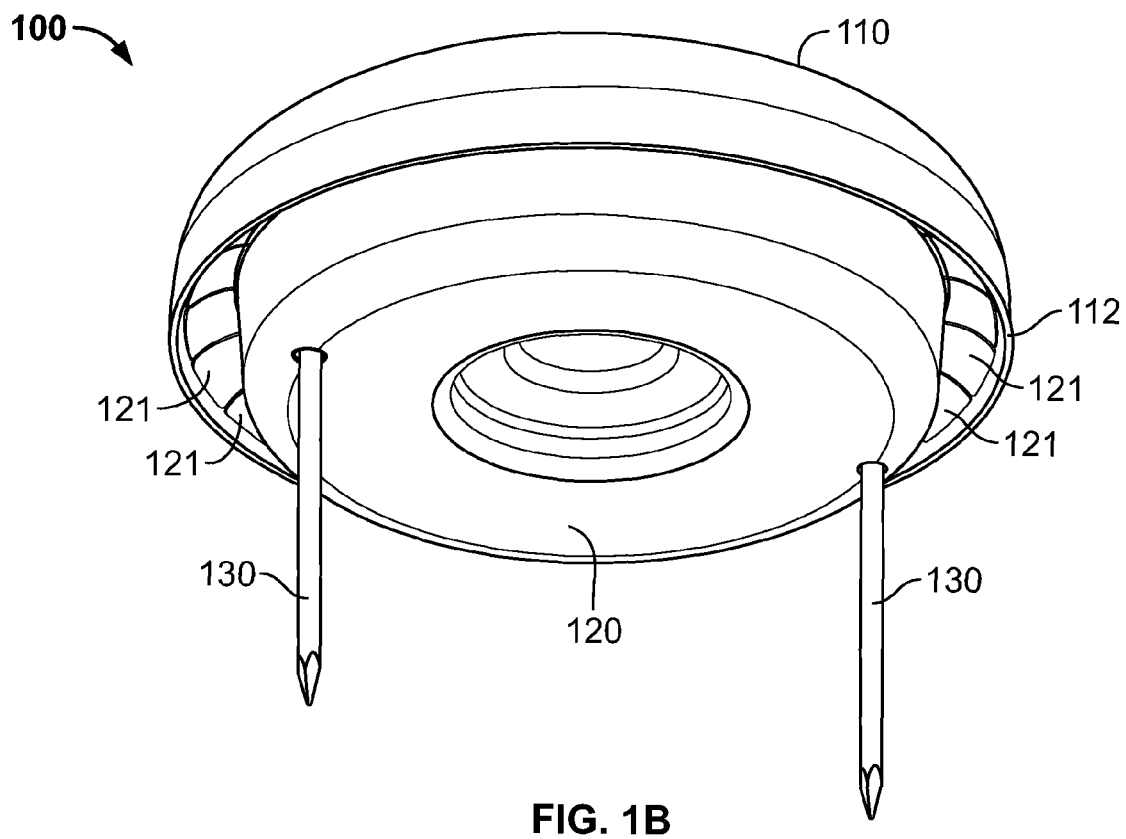
FIG. 1B illustrates a bottom perspective view of the electrical cord connection covering apparatus, according to certain inventive techniques.
Figure 2A:
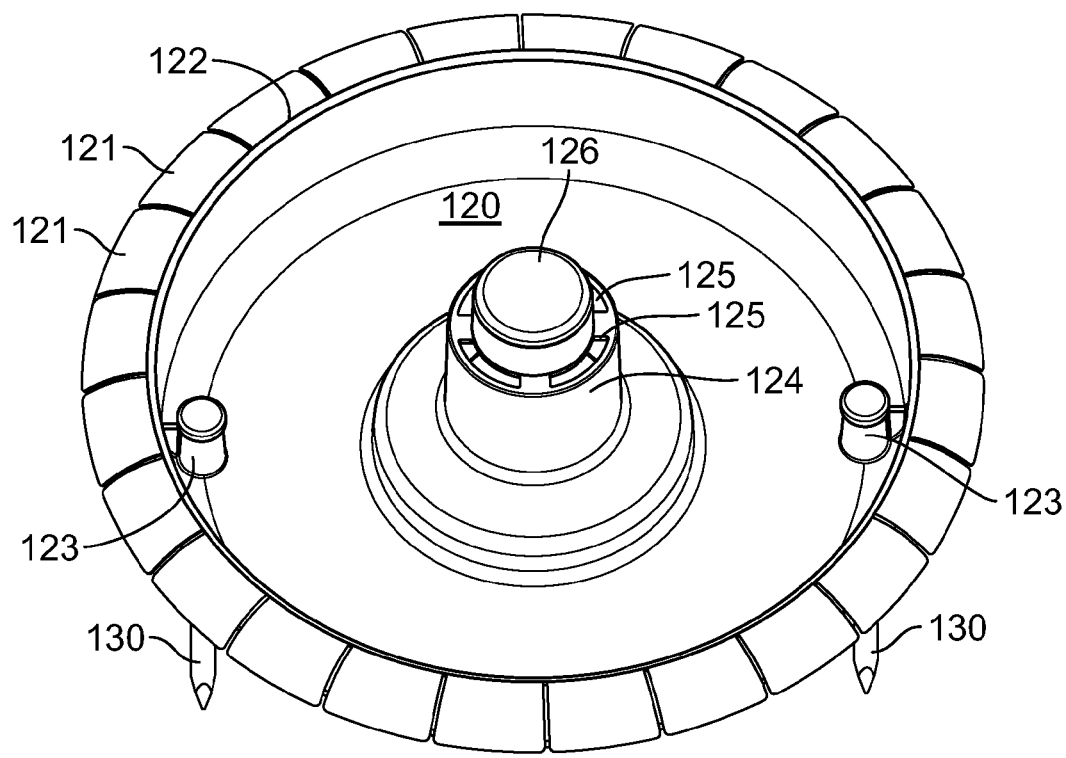
FIG. 2A illustrates a top perspective view of a lower portion of an electrical cord connection covering apparatus, according to certain inventive techniques.
Figure 2B:
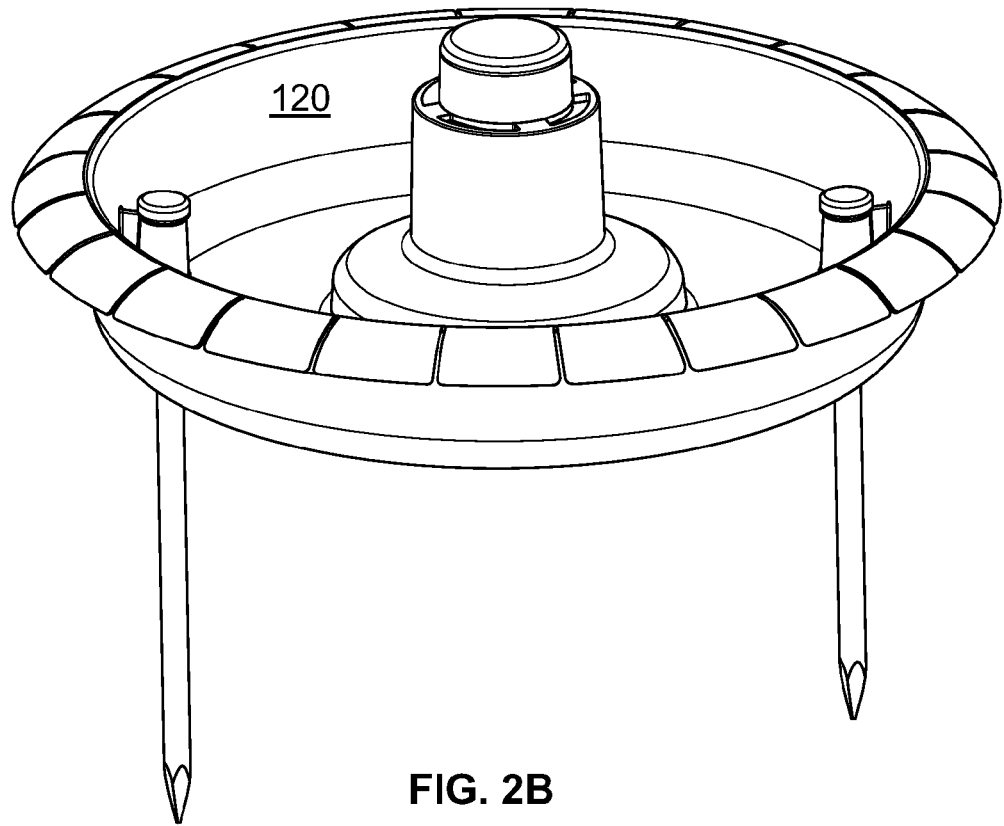
FIG. 2B illustrates a top perspective view of the lower portion of the electrical cord connection covering apparatus, according to certain inventive techniques.
Figure 2C:
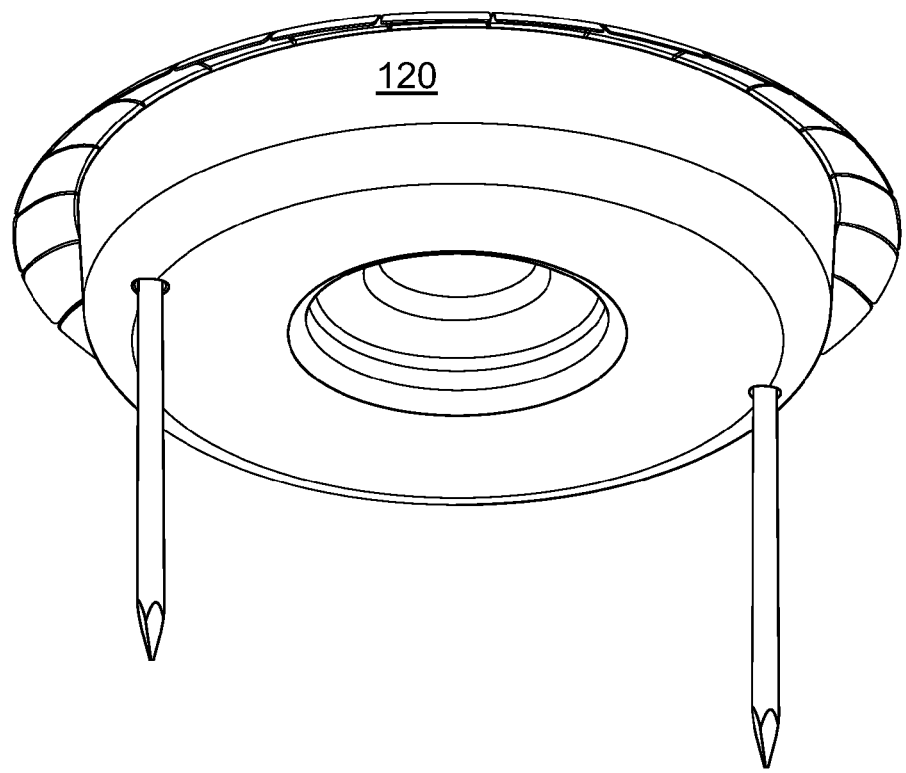
FIG. 2C illustrates a bottom perspective view of the lower portion of the electrical cord connection covering apparatus, according to certain inventive techniques.
Figure 3:
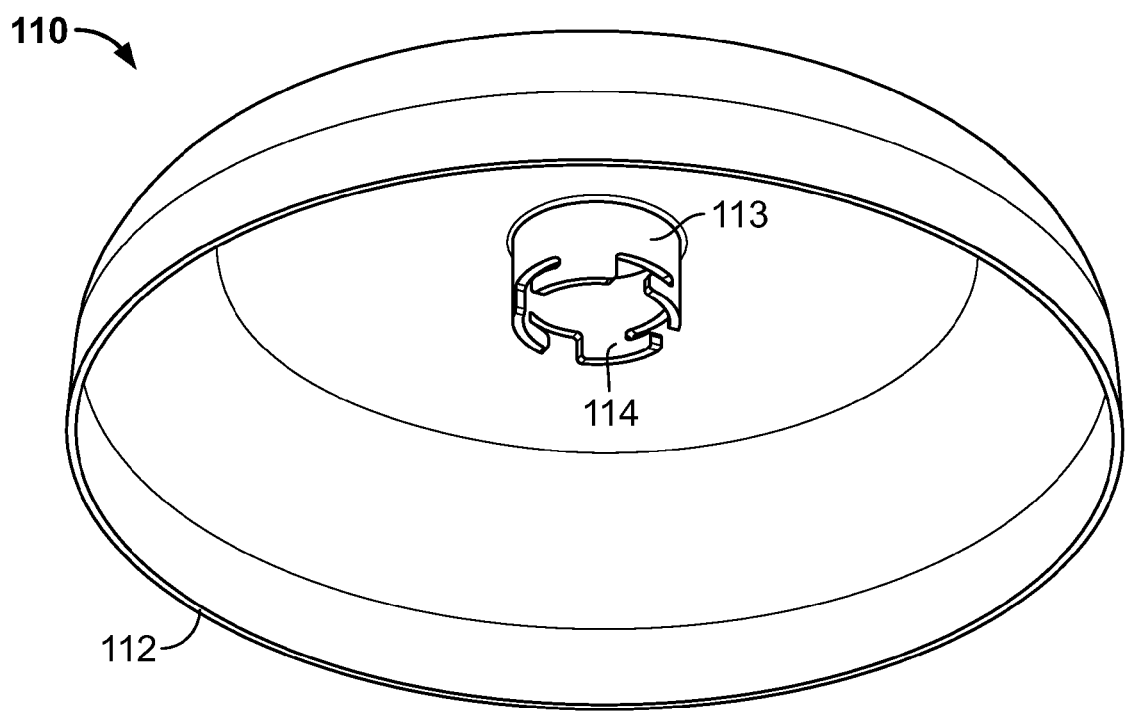
FIG. 3 illustrates a bottom perspective view of the upper portion of the electrical cord connection covering apparatus, according to certain inventive techniques.

FIGS. 1A and 1B illustrate a top and bottom perspective views, respectively, of an electrical cord connection covering apparatus 100, according to certain inventive techniques. The apparatus 100 may include an upper portion 110, a lower portion 120, and one or more securing members 130. Perspective views of the lower portion 120 are illustrated in FIGS. 2A (top perspective), 2B (top perspective), and 2C (bottom perspective). A bottom perspective view of the upper portion 110 is illustrated in FIG. 3. The following description of apparatus 100 is made with respect to these figures. One with ordinary skill in the art will understand that all of the depicted features of the apparatus 100 may not be essential, and that such features are shown in conjunction with apparatus 100 for completeness. For example, the securing member(s) 130 are not essential to certain inventive techniques disclosed herein.

The upper portion 110 may generally form an inverted bowl shape. Other shapes are possible, such as a cone or cylinder. The upper portion 110 may include a handle 111, a lower rim 112, a downwardly facing projection 113, and a plurality of mating features 114 on the projection 113. The handle 111 is engageable by a user to rotate the upper portion 110 clockwise or counterclockwise, or to move the upper portion 110 up or down. The downward facing projection 113 may extend from the inner surface of the upper portion 110. The downwardly facing projection 113 may have a hollow interior. The plurality of mating features 114 may be oriented circumferentially or tangentially around the projection 113. The mating features 114 may include a plurality of notches and corresponding grooves.

The lower portion 120 may generally form a bowl shape. Other shapes are possible, such as a cone or cylinder. The lower portion 120 may include a plurality of flexible tabs 121, an upper rim 122, one or more securing member holders 123, and an upwardly facing projection 124. The upwardly facing projection 124 may include a plurality of mating features 125 and a guide/stop portion 126.

A given securing member holder 123 may hold a securing member 130. Such a securing member 130 may be a stake, a screw, a spike, or another means for securing the apparatus 100 to a surface upon which the lower portion 120 would normally rest. The securing member 130 may be engageable/removable from the securing member holder 123. For example, the securing member holder 123 may include an aperture through which the securing member 130 is inserted. The aperture may pass through an outer surface of the lower portion 120, thereby allowing the securing member 130 to be inserted into the resting surface.

The tabs 121 may partially, substantially, or completely surround the upper rim 122. Each of the tabs 121 may extend outwardly or downwardly from the upper rim 122. The outer diameter of the lower portion 120 (for example, a diameter defined by the outer edges of one or more tabs 121) may be larger than the inner diameter of the upper portion 110 (for example, a diameter defined by the inner diameter of the lower rim 112). When viewed from the top of the lower portion 120, each of the flexible tabs 121 may have a convex curvature. Alternatively, the curvature may be concave or flat. The 121 may have other shapes, such as a stair-case profile with one or more ledges. Each of the flexible tabs 121 may have a width between approximately ¼" and ½" (for example, ⅜"). Each of the flexible tabs 121 may have a thickness of 0.031". Each of the flexible tabs 121 may have a hardness of approximately between 60 Shore A to 75 Shore D (for example, 45 Shore D). The flexible tabs 121 may be separated from one another by a distance of approximately 0.031"-0.25" (for example, 0.063").

The use and operation of the apparatus 100 can be understood in view of the following description. A user may begin by placing the lower portion 120 on a resting surface (for example, the ground). The securing member holders 123 then present, to the user, apertures extending through the lower portion 120. The user may then insert the securing members 130 (for example, stakes) into the securing member holders 123, such that the securing members 130 penetrate the resting surface. A given securing member 130 may have a head upon which a user may hammer or otherwise exert a force to drive the securing member 130 into the resting surface. The head may also prevent over-insertion of the securing member 130 into the securing member holder 123.

The user may then create an arrangement of plugs and sockets and place them within the lower portion 120. Cords extending from the plugs and sockets may be oriented such that they traverse from the inner region of the lower portion 120 to outside the lower portion 120. Parts of the traversing cords will, then, rest on one or more of the flexible tabs 121.

Once the plugs, sockets, and cords are in place, the upper portion 110 may be engaged with the lower portion 120. When placing the upper portion 110 on the lower portion 120, the guide/stop portion 126 may fit within the hollow region of the downwardly facing projection 113. As the upper portion 110 is lowered, the guide/stop portion 126 may fit into the hollow region of the downwardly facing projection 113, thereby causing alignment of the primary axes of the upper and lower portions 110, 120. The guide/stop portion 126 may also regulate the orientation between the upper portion 110 and the lower portion 120 by preventing over-insertion.

Once in the proper orientation, the mating features 114 may engage with the mating features 125. The mating features 125 may be apertures that accept mating features 114 (for example notches). The mating features 114, 125 may mate with each other by inserting and then rotating the mating features 114 with respect to the mating features 125. Rotation may be accomplished via the handle 111 on the upper portion 110. Other mating features are contemplated besides those depicted. For example, mating features may include complementary male and female screw threads.

As the upper portion 110 is engaging the lower portion 120, seals may be formed between the flexible tabs 121 and the interior surface or the lower rim 112 of the upper portion 110. The tabs 121 may have a spring-like quality. When the inner diameter of the upper portion 110 is smaller than the outer diameter of the tabs 121, the upper portion 110 compresses the tabs 121 downwardly and inwardly as the upper portion 110 engages with the lower portion 120. Once compressed, the tabs 121 exert a force against the upper portion 110 to form seals. These seals assist in keeping moisture out of an interior region formed between the upper portion 110 and the lower portion 120.

As another alternative, the flexible tabs 121 may have a lip that engages with the lower rim 112 of the upper portion 110. As the tabs 121 are compressed, a force is exerted between the lower rim 112 of the upper portion and the lips of the tabs 121, thereby forming seals.

Figure 4:
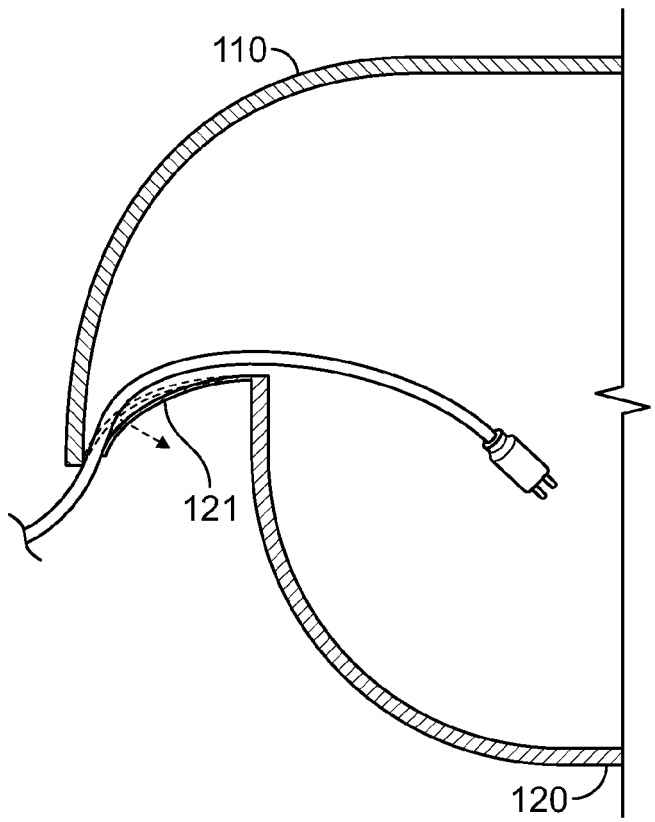
FIG. 4 illustrates a cross-sectional view of the electrical cord connection covering apparatus covering an electrical cord, according to certain inventive techniques.

Referring to FIG. 4, a cross-sectional view of the apparatus 100 is shown while covering a plug of a cord. Before the upper portion 110 was engaged with the lower portion 120, the cord was lying on tab 121. As the upper portion 110 engaged the lower portion 120, the upper portion 120 pushed the cord down on the tab 121, thereby causing compression of the tab 121 (depicted with arrow). The dotted lines indicate the position of the tab 121 before compression, and the solid lines indicate the position of the tab 121 after compression. Once compressed, the tab 121 exerts a pressure against the cord, and the cord, in turn, presses against the upper portion 110. This may provide an additional benefit of strain relief. In other words, the compression of the cord between the tab 121 and the upper portion may facilitate securement of the position of the cord with respect to a plug/socket connection. This may prevent unintentional acts (for example, tripping over the cord) from disconnecting the connection.

In the configuration depicted in FIG. 4, the compressed tab 121 does not touch or does not fully touch the upper portion 110. Consequently, a tab 121 that accommodates a cord may not form a full seal with the upper portion 110. It should also be noted that no seal is formed at the gaps between the tabs 121. Thus, while the tabs 121 may generally assist in preventing moisture from entering the interior region of the apparatus 100, the overall seal may not be perfect and some moisture may get into the interior region.

Figure 5:
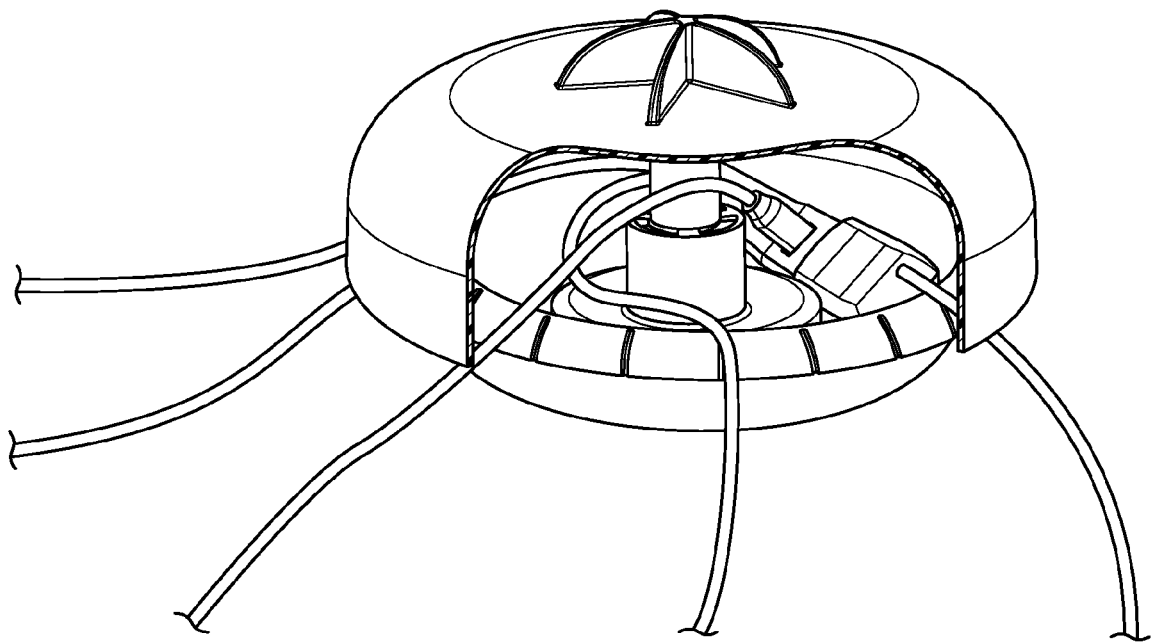
FIG. 5 illustrates a cut-away view of the electrical cord connection covering apparatus covering various electrical cord connections.

Turning to FIG. 5, a cut-away view of apparatus 100 is depicted, whereby the interior region can be seen. As illustrated, the interior region of the apparatus 100 can accommodate cords and connections of various sizes, numbers, and shapes.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the inventive techniques not be limited to the particular techniques disclosed, but that they will include all techniques falling within the scope of the appended claims.

The invention claimed is:

1. An apparatus for covering at least a portion of a cord, wherein the apparatus comprises:
    a lower portion including:
        a bowl region having an upper rim;
        a plurality of flexible tabs each extending outwardly from the upper rim; and
        an upwardly projecting portion; and
    an upper portion including a downwardly projecting portion configured to removably mate with the upwardly projecting portion by rotating the downwardly projecting portion with respect to the upwardly projecting portion, thereby mating the lower portion with the upper portion.

2. The apparatus of claim 1, wherein the plurality of flexible tabs each extend downwardly from the upper rim of the bowl region.

3. The apparatus of claim 2, wherein each of the plurality of flexible tabs comprise a curvature.

4. The apparatus of claim 3, wherein each of the plurality of flexible tabs curve downward and outward from the upper rim of the lower portion.

5. The apparatus of claim 1, wherein the upper portion comprises a lower rim that extends below the outer edges of each of the plurality of flexible tabs when the upper portion is mated to the lower portion.

6. The apparatus of claim 1, wherein the upper portion contacts each of the plurality of flexible tabs when the upper portion is mated to the lower portion.

7. The apparatus of claim 1, further comprising a securing member extending downwardly from the lower portion.

8. The apparatus of claim 7, wherein the securing member is removably mateable to the lower portion.

9. The apparatus of claim 1, wherein the plurality of flexible tabs completely surround the upper rim of the bowl region.

10. The apparatus of claim 1, wherein each of the plurality of flexible tabs comprises a width of between approximately ¼ inch to approximately ½ inch.

11. The apparatus of claim 10, wherein each of the plurality of flexible tabs comprises a width of approximately ⅜ inch.

12. The apparatus of claim 1, wherein the each of plurality of flexible tabs have a thickness between approximately 0.031 inch-0.25 inch.

13. The apparatus of claim 12, wherein each of the plurality of flexible tabs have a thickness of approximately 0.031 inch.

14. The apparatus of claim 1, wherein each of the plurality of flexible tabs have a hardness of approximately 45 shore D.

15. The apparatus of claim 1, wherein the plurality of flexible tabs are separated from one another by a distance of between approximately 0.031 inch-0.25 inch.

16. The apparatus of claim 15, wherein the plurality of flexible tabs are separated from one another by a distance of approximately 0.063 inch.

* * * * *